United States Patent
Lindholm et al.

(10) Patent No.: US 10,286,846 B1
(45) Date of Patent: May 14, 2019

(54) HANDRAIL LINKAGE MECHANISM FOR A MACHINE

(71) Applicant: Caterpillar Paving Products Inc., Brooklyn Park, MN (US)

(72) Inventors: Tim Lindholm, Blaine, MN (US); Ryan Bradley Fletcher, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 15/897,342

(22) Filed: Feb. 15, 2018

(51) Int. Cl.
  *E01C 23/088* (2006.01)
  *B60R 3/00* (2006.01)
  *E04H 17/14* (2006.01)

(52) U.S. Cl.
  CPC ......... *B60R 3/005* (2013.01); *E04H 17/1413* (2013.01); *E01C 23/088* (2013.01); *E01C 2301/40* (2013.01)

(58) Field of Classification Search
  CPC .......................... E01C 2301/40; B60R 3/005
  USPC ........................................................ 182/113
  See application file for complete search history.

(56) References Cited

U.S. PATENT DOCUMENTS

| | | | | |
|---|---|---|---|---|
| 4,787,111 A | * | 11/1988 | Pacek | B65G 69/22 14/71.1 |
| 5,634,529 A | * | 6/1997 | Nguyen | E06C 5/06 182/113 |
| 6,722,612 B2 | * | 4/2004 | Konya | B64F 1/305 14/71.1 |
| 9,126,536 B2 | * | 9/2015 | Meacham | E04G 5/14 |
| 9,487,145 B2 | | 11/2016 | Koshy | |
| 9,677,249 B2 | | 6/2017 | Holcomb et al. | |
| 2003/0020253 A1 | | 1/2003 | Bosman et al. | |
| 2016/0311376 A1 | | 10/2016 | Dokter et al. | |

FOREIGN PATENT DOCUMENTS

| | | |
|---|---|---|
| CN | 102852081 | 1/2013 |
| DE | 102013006105 | 10/2014 |
| WO | WO2015178511 | 11/2015 |

* cited by examiner

*Primary Examiner* — Janine M Kreck

(57) ABSTRACT

A linkage mechanism associated with a handrail assembly of a machine is provided. The handrail assembly is coupled to an operator platform. The handrail assembly includes a first handrail member coupled to the frame. The linkage mechanism connects the first handrail member to the frame such that the first handrail member can be pivotally moved between an extended position and a retracted position. The linkage mechanism includes a first bracket and a pair of linkage members. The first bracket is coupled to the frame. The pair of linkage members pivotally connect the first bracket with the first handrail member. The first bracket, the pair of linkage members and the first handrail member together form a four-bar linkage. Further, a spring biased latching mechanism is configured to retain the handrail assembly in a retracted or an extended position.

20 Claims, 9 Drawing Sheets

HANDRAIL LINKAGE MECHANISM FOR A MACHINE

TECHNICAL FIELD

The present disclosure relates to a handrail assembly coupled to a machine. More specifically, the present disclosure relates to a linkage mechanism associated with the handrail assembly of the machine.

BACKGROUND

Handrails are provided on a variety of machines. Some of these handrails have a foldable design, allowing the handrails to move between an extended position and a retracted position. Typically, handrails may be used in machines such as in cold planers or other similar machines which may be used in underground applications. The handrails may need to be collapsed in order to prevent the collision of handrails with roadside barriers or obstructions, since handrails are typically the widest part of the machine determining the overall transport width.

A variety of locking mechanisms may be used for collapsing the handrails. Some examples include handrails having foldable designs wherein a locking mechanism is designed to allow the handrail to move between an upright position and a collapsed position. Some other examples may include other types of pivotable arrangements, and mechanical connections which may allow the handrail to move between two or more positions.

An example can be provided by U.S. Pat. No. 9,487,145 which discloses a locking mechanism associated with a handrail of a machine such as a mining truck or an articulated truck. The locking mechanism includes a housing configured to receive the handrail and a pair of slots is provided on opposite side surfaces of the housing. Each of the side surfaces is adjacent to the side open end. A bracket is affixed to any one of the side surface of the housing. A locking member is pivotally coupled to the bracket. A first arm of the locking member is selectively engaged with the pair of slots to retain the handrail in the upright position. On exerting a force in an upward direction on a second arm of the locking member the first arm is selectively released from the pair of slots to allow the handrail to move from an upright position to a collapsed position.

SUMMARY

In an aspect of the present disclosure, a machine is provided which includes a frame and an operator platform supported over the frame. The operator platform has a front end and a rear end. A handrail assembly is coupled to the operator platform. The handrail assembly includes a first handrail member coupled to the frame towards the front end. A linkage mechanism connects the first handrail member to the frame such that the linkage mechanism allows the first handrail member to be pivotally moved between an extended position and a retracted position. The linkage mechanism includes a first bracket and a pair of linkage members. The first bracket is coupled to the frame. The pair of linkage members pivotally connect the first bracket with the first handrail member. The first bracket, the pair of linkage members and the first handrail member together form a four-bar linkage.

In another aspect of the present disclosure, a handrail assembly is provided for a machine. The handrail assembly includes a first handrail member coupled to a frame of the machine. The handrail assembly includes a linkage mechanism which connects the first handrail member to the frame. The linkage mechanism allows the first handrail member to be pivotally moved between an extended position and a retracted position. The linkage mechanism includes a first bracket and a pair of linkage members. The first bracket is coupled to the frame. The pair of linkage members pivotally connect the first bracket with the first handrail member. The first bracket, the pair of linkage members and the first handrail member together form a four-bar linkage.

In yet another aspect of the present disclosure, a machine is provided with a plurality of ground engaging members, a frame, a cutting mechanism, an operator platform, an extension platform and a handrail assembly. The ground engaging members are adapted to propel the machine. The frame is supported over the plurality of ground engaging members. The cutting mechanism is coupled to the frame and includes a housing defining a cutting chamber. A rotatable cutter is positioned within the cutting chamber to cut material of a substrate underlying the machine. The operator platform is supported over the frame. The operator platform has a front end and a rear end. The extension platform is pivotally coupled to the operator platform. The handrail assembly is coupled to the operator platform and extends over the extension platform. The handrail assembly includes a first handrail member and a linkage mechanism. The first handrail member is coupled to the frame towards the front end. The linkage mechanism connects the first handrail member to the frame such that the first handrail member is pivotally moved between an extended position and a retracted position. The linkage mechanism includes a first bracket and a pair of linkage members. The first bracket is coupled to the frame. The pair of linkage members pivotally connect the first bracket with the first handrail member. The first bracket, the pair of linkage members and the first handrail member together form a four-bar linkage.

Other features and aspects of this disclosure will be apparent from the following description and the accompanying drawings.

DETAILED DESCRIPTION

Figure 1:
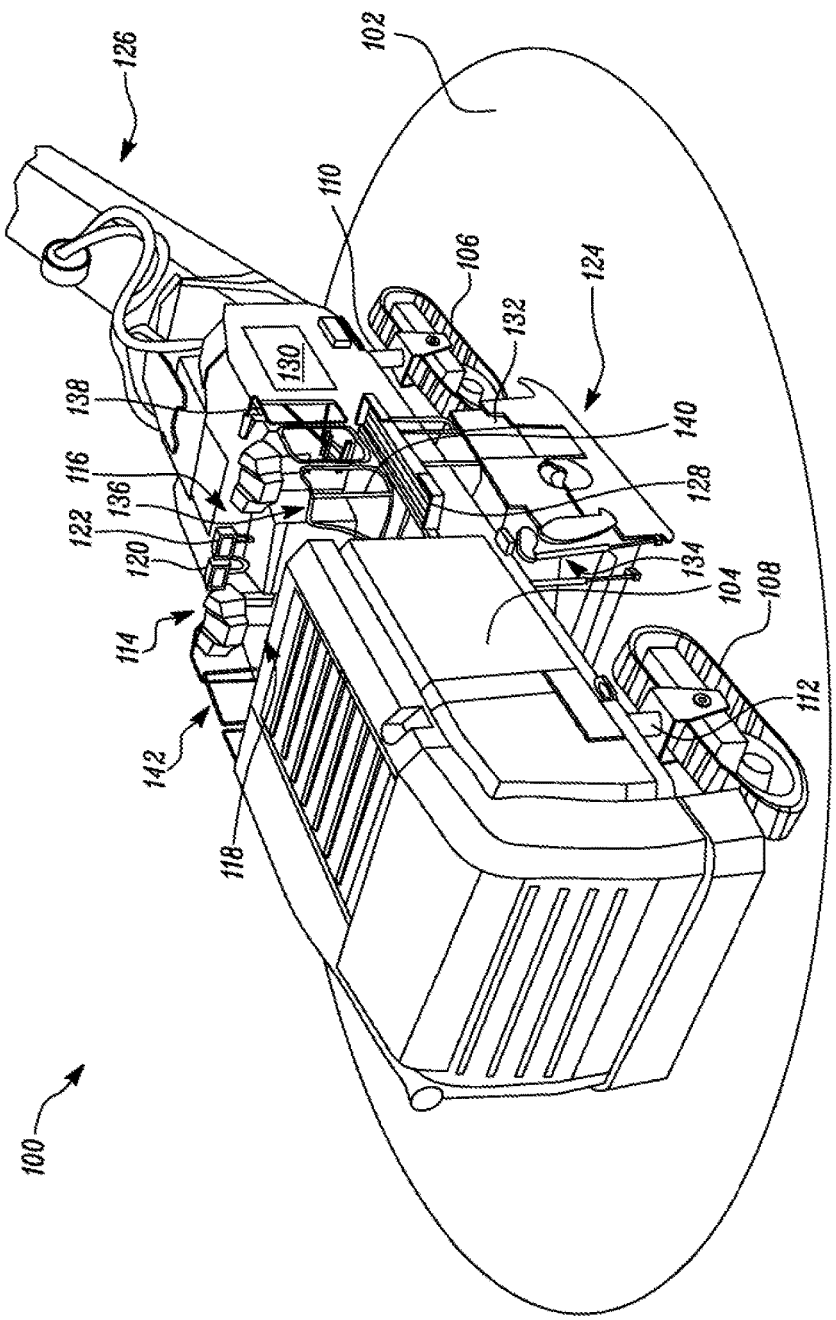
FIG. 1 shows a perspective view of a machine showing a handrail assembly in an extended configuration, according to an aspect of the present disclosure.

Wherever possible, the same reference numbers will be used throughout the drawings to refer to same or like parts. FIG. 1 illustrates a perspective view of an exemplary machine 100, in accordance with the present disclosure. The machine 100 may be a mobile machine operable to move along a ground surface 102 that is underneath the machine 100. The ground surface 102 may be a man-made surface, such as a road, parking lot, concrete cement, or other paved surface. The machine 100 may be configured to perform various functions when traveling over the ground surface 102. In the embodiment shown in FIG. 1, the machine 100 is illustrated as a cold planer. The machine 100 may cut or grind a top layer of concrete, asphalt, or similar material. It should be contemplated that the machine 100 may be any other machine as well which may be suitable for application with various embodiments of the present disclosure.

The machine 100 includes a frame 104 supported by a plurality of ground engaging members. The plurality of ground engaging members includes a pair of front ground engaging member 106 and a pair of rear ground engaging member 108. The ground engaging members 106, 108 may each include either a wheel or a track section that is pivotable in one or more directions. The ground engaging members 106, 108 are connected to respective lifting columns 110, 112, which may be adapted to controllably raise and lower the frame 104 relative to the associated ground engaging members 106, 108.

The frame 104 supports an operator platform 114 having a front end 116 and a rear end 118. The operator platform 114 has a steering command element 120 and a controller 122. The steering command element 120 is shown to include a control panel, but other steering devices such as a steering wheel, a joystick or levers could be used as well. The controller 122 may send control signals to one or more actuators (not shown) of the ground engaging members 106, 108, the lifting columns 110, 112, a cutting mechanism 124 and/or a debris removal system 126. The controller 122 may be a separate control unit or may be part of a central control unit operable to control additional functions of the machine 100.

An extension platform 128 is coupled to the operator platform 114 such that the extension platform 128 is a lateral extension of the operator platform 114. The extension platform 128 may pivot or otherwise move relative to the operator platform 114 between an operational position and a non-operational position. In certain embodiments the extension platform 128 may rotate about an axis to pivot from the operational position to a non-operational position. In other embodiments, the extension platform 128 may retract via linear actuators or other known mechanisms to nest within the operator platform 114 while in the non-operational position. The extension platform 128 may allow an operator to walk over the extension platform 128 to perform various functions, as well as to have a better visibility towards front/rear of the machine 100, or the cutting mechanism 124.

The frame 104 may also support the cutting mechanism 124, and an engine 130 which may be an internal combustion engine. The engine 130 may supply power to drive one or more of the ground engaging members 106, 108 to propel the machine 100 relative to the ground surface 102. The engine 130 may also supply power to the cutting mechanism 124 to break up the ground surface 102. The cutting mechanism 124 includes a housing 132 which defines a cutting chamber 134. A rotatable cutter (not visible) is positioned within the housing 132. The rotatable cutter cuts material of a substrate underlying the machine 100. The debris removal system 126 may remove the material cut by the cutting mechanism 124 and transport the material to be suitably disposed.

The machine 100 further includes a handrail assembly 136 coupled to the frame 104. The handrail assembly 136 is coupled to the operator platform 114 and extends over the extension platform 128. The handrail assembly 136 includes a first handrail member 138 and a second handrail member 140. The first handrail member 138 and the second handrail member 140 may move together, or independent of each other. FIG. 1 illustrates the machine 100 with the handrail assembly 136 in an extended position. Both the first handrail member 138 and the second handrail member 140 are shown in an extended position.

Figure 2:
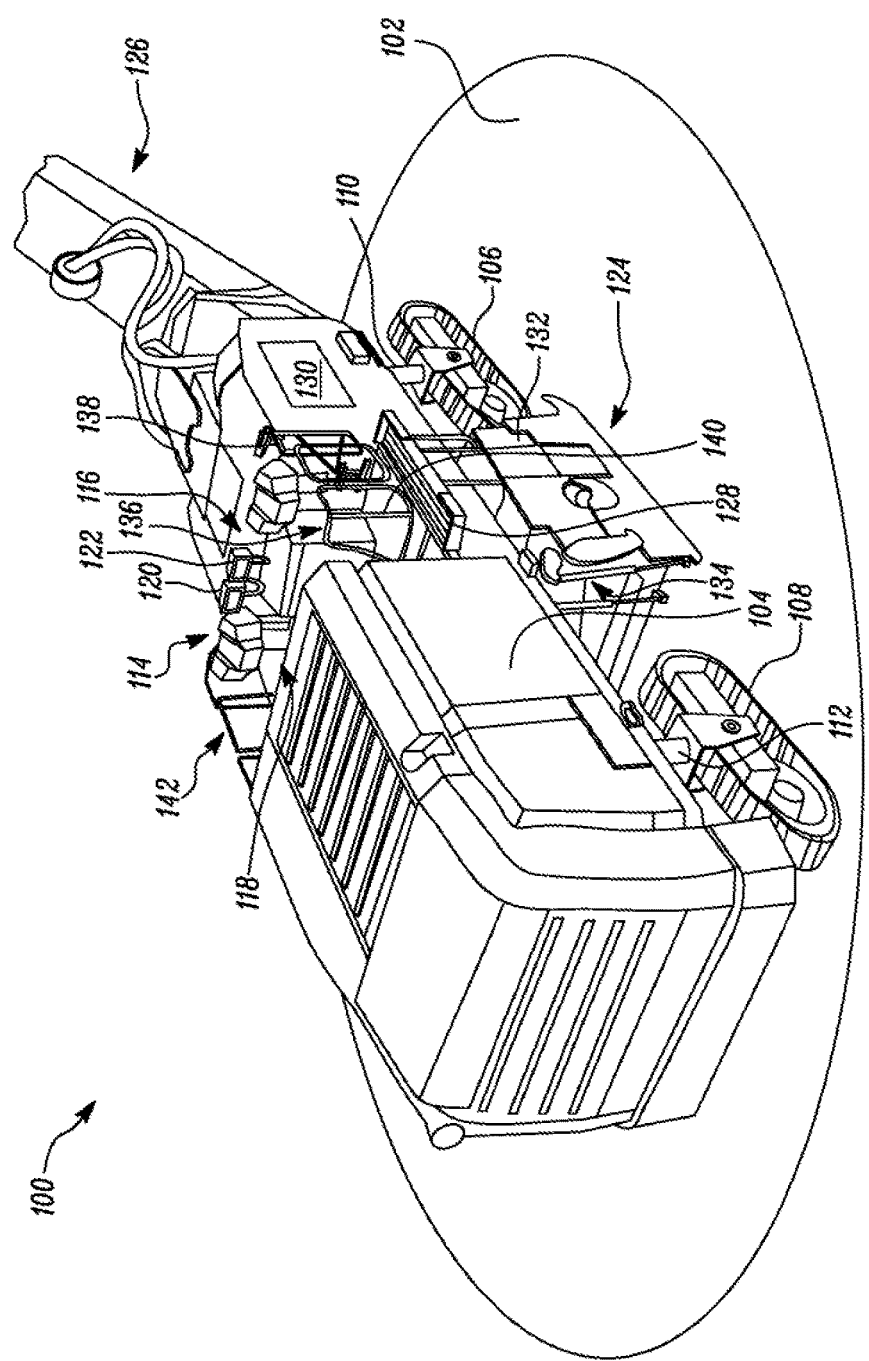
FIG. 2 shows a perspective view of a machine showing the handrail assembly in a partially retracted configuration, according to an aspect of the present disclosure.
Figure 3:
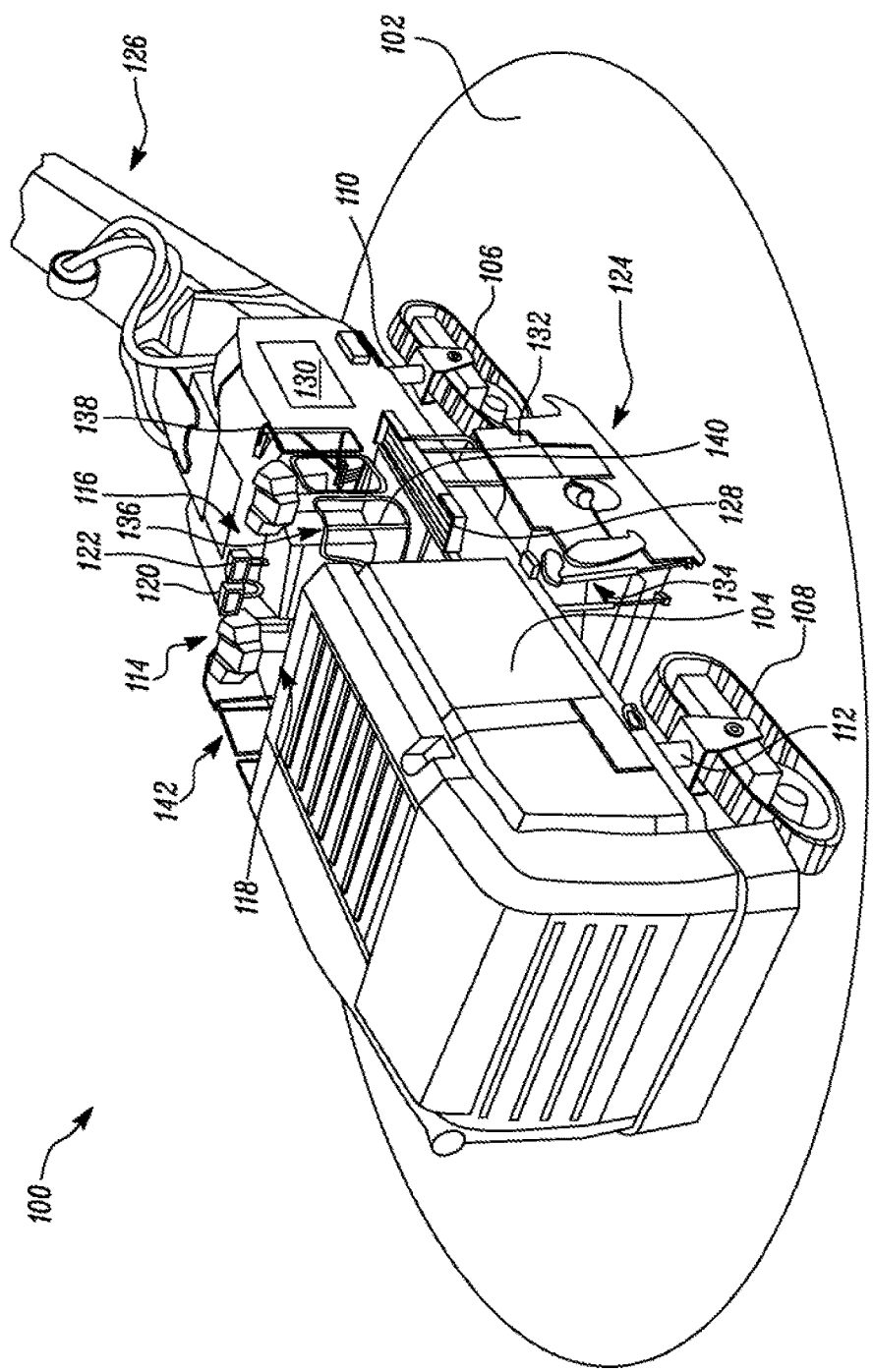
FIG. 3 shows a perspective view of the machine showing the handrail assembly in a retracted configuration, according to an aspect of the present disclosure.

FIG. 2 illustrates the machine 100 with the handrail assembly 136 in a partially retracted position. The first handrail member 138 is in a retracted position, and the second handrail member 140 is still in the extended position. Further, FIG. 3 illustrates the handrail assembly 136 in the retracted position. Both the first handrail member 138 and the second handrail member 140 are shown in the retracted position. With combined reference to FIGS. 1-3, it should be understood that the machine 100 may include another handrail assembly 142 coupled to the frame 104 of the machine 100 towards other side of the machine 100 which is similar to the handrail assembly 136 in structural and functional aspects. The handrail assembly 142 is not being discussed in detail in order to avoid repetition of subject matter.

Figure 4:
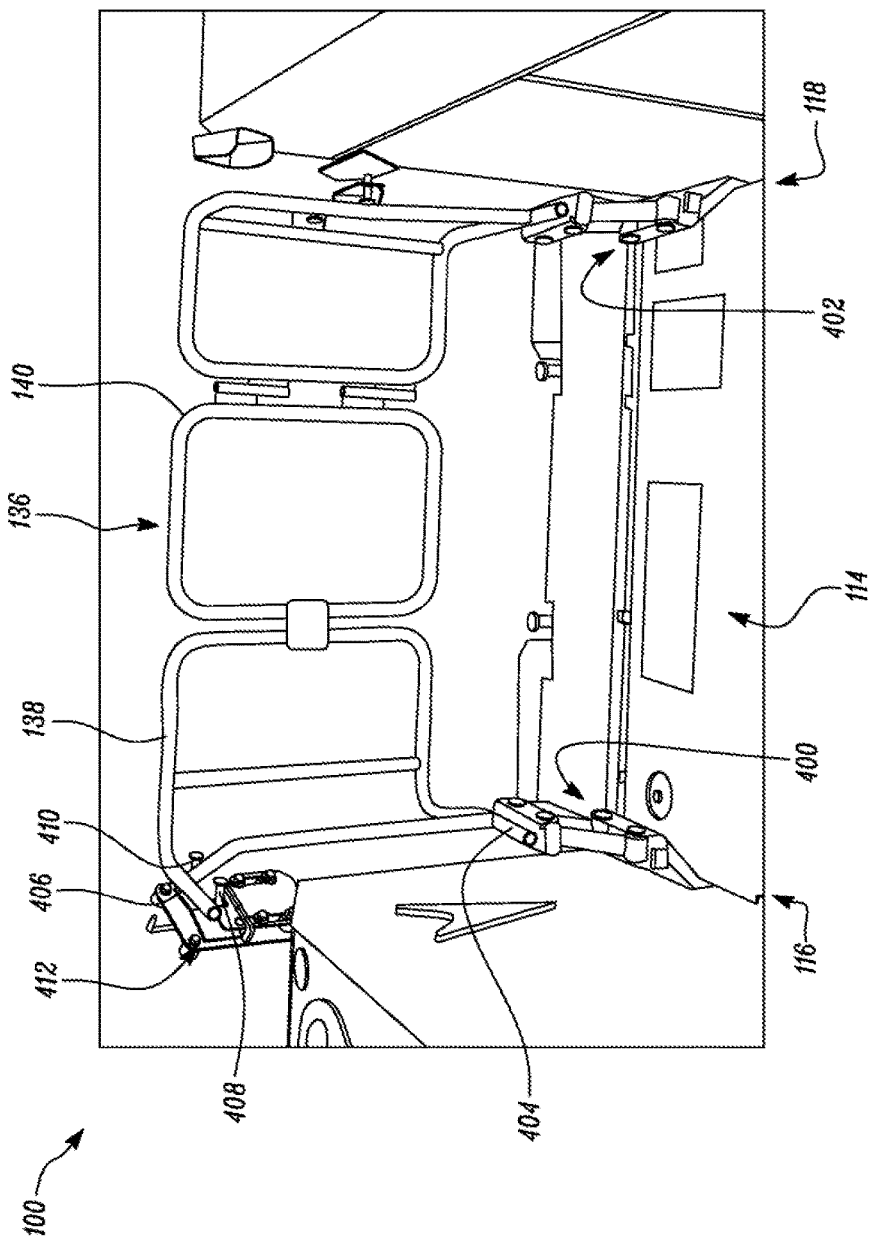
FIG. 4 shows a side view of the machine showing the handrail assembly in the extended configuration, and the linkage mechanisms coupling the handrail assembly to the machine, according to an aspect of the present disclosure.

FIG. 4 shows a side view of the machine 100 having the handrail assembly 136 in the extended configuration. The handrail assembly 136 is coupled to the frame 104 of the machine 100 through a first linkage mechanism 400 and a second linkage mechanism 402. The first linkage mechanism 400 couples the handrail assembly 136 to the frame 104 towards the front end 116 of the operator platform 114. More specifically, the first linkage mechanism 400 couples the first handrail member 138 to the frame 104 towards the front end 116 of the operator platform 114. Similarly, the second linkage mechanism 402 couples the handrail assembly 136 to the frame 104 towards the rear end 118 of the operator platform 114. More specifically, the second linkage mechanism 402 couples the second handrail member 140 to the frame 104 towards the rear end 118 of the operator platform 114.

The first handrail member 138 includes a first arm 404 and a second arm 406 extending towards the operator platform 114 from the first handrail member 138. A first engagement pin 408 and a second engagement pin 410 are coupled to the second arm 406 in a spaced apart manner from each other. The handrail assembly 136 further includes a latching mechanism 412 for retaining the handrail assembly 136 with the frame 104 of the machine 100 in either of the extended position and the retracted position with help of the first and second engagement pins 408, 410. Further structural details of the latching mechanism 412 will be discussed in forthcoming description.

Figure 5:
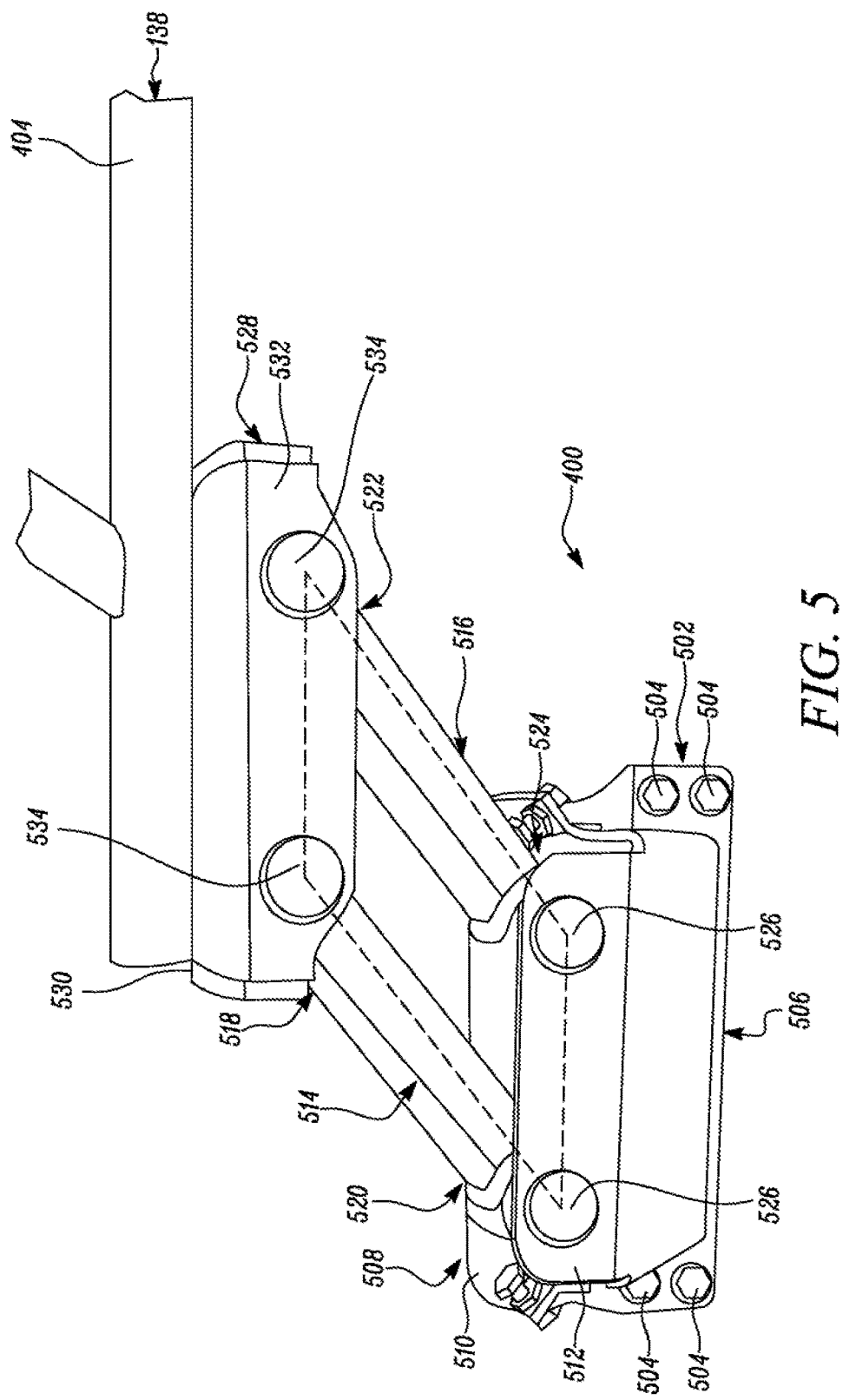
FIG. 5 shows a perspective view of the linkage mechanism illustrating four-bar linkage formed by the linkage mechanism, according to an aspect of the present disclosure.

FIG. 5 shows further structural details of the first linkage mechanism 400. The first linkage mechanism 400 includes a first bracket 502 rigidly coupled to the frame 104. The first bracket 502 may be coupled to the frame 104 through any suitable mechanical joining means such as mechanical fasteners, welding, adhesive means etc. In the illustrated embodiment, the first bracket 502 is coupled to the frame 104 through fasteners 504. The first bracket 502 includes a first portion 506 which may include openings (not visible) to receive the fasteners 504 for coupling the first bracket 502 with the frame 104. The first bracket 502 further includes a second portion 508. The second portion 508 is illustrated as having a U-shaped structure defined by a first wall 510 and a second wall 512. The first wall 510 and the second wall 512 together define a groove inside which a pair of linkage members are received.

The pair of linkage members includes a first linkage member 514 and a second linkage member 516. The first linkage member 514 has a top end 518 and a bottom end 520. Similarly, the second linkage member 516 has a top end 522 and a bottom end 524. The first linkage member 514 is coupled to the first bracket 502 at the bottom end 520, and the second linkage member 516 is coupled to the first bracket 502 at the bottom end 524. The first linkage member 514 and the second linkage member 516 may pivot about the respective bottom ends 520, 524 about the first bracket 502. The first linkage member 514 and the second linkage member 516 may be coupled to the first bracket 502 through any suitable mechanical joining means such as mechanical fasteners, welding, adhesive means etc. In the illustrated embodiment, first linkage member 514 and the second linkage member 516 are coupled to the first bracket 502 by pivot pins 526.

The first linkage mechanism 400 further includes a second bracket 528 coupled to the first linkage member 514 and the second linkage member 516 at the respective top ends 518, 522. The second bracket 528 has a similar structure as of the first bracket 502. The second bracket 528 has a U-shaped structure defined by a first wall 530 and a second wall 532. The first wall 530 and the second wall 532 together define a groove inside which the first linkage member 514 and the second linkage member 516 are received. The second bracket 528 receives the top end 518 of the first linkage member 514, and the top end 522 of the second linkage member 516.

The first linkage member 514 and the second linkage member 516 may pivot about the respective top ends 518, 522 about the second bracket 528. The first linkage member 514 and the second linkage member 516 may be coupled to the second bracket 528 through any suitable mechanical joining means such as mechanical fasteners, welding, adhesive means etc. In the illustrated embodiment, the first linkage member 514 and the second linkage member 516 are coupled to the second bracket 528 by pivot pins 534. The first bracket 502, the second bracket 528, the first linkage member 514, and the second linkage member 516 together define a four-bar linkage. The first bracket 502, the first linkage member 514, the second linkage member 516, and the second bracket 528 form four sides, and the pivot pins 526, 534 form vertices of the four-bar linkage.

Figure 6:
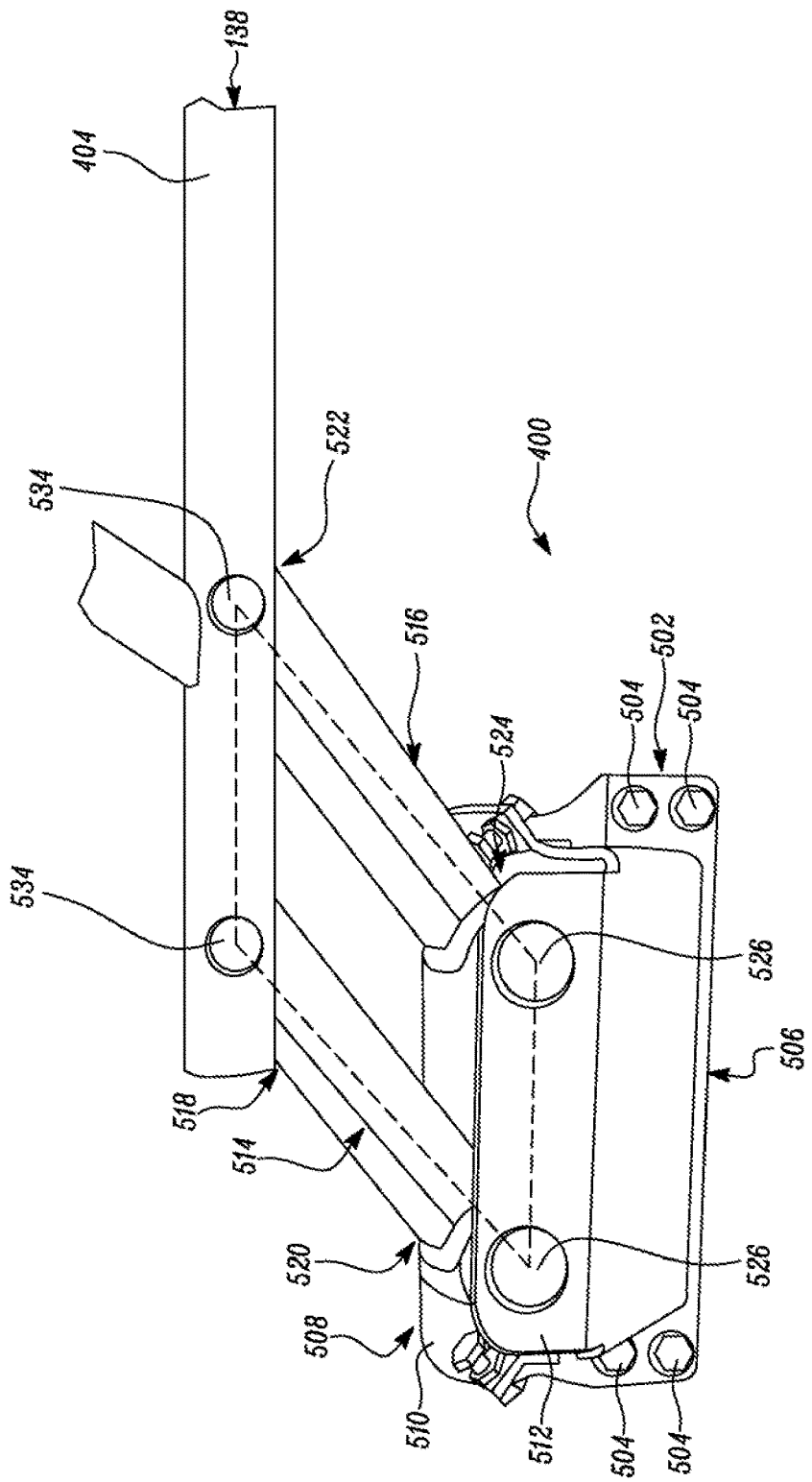
FIG. 6 shows a perspective view of the linkage mechanism illustrating four-bar linkage formed by the linkage mechanism, according to another aspect of the present disclosure.

The second bracket 528 is further coupled to the first handrail member 138. More specifically, the second bracket 528 is coupled to the first arm 404 of the first handrail member 138. In another embodiment as shown in FIG. 6, the handrail assembly 136 does not include the second bracket 528, and the first and second linkage members 514, 516 are coupled to the first handrail member 138. More specifically, the first linkage member 514 and the second linkage member 516 are pivotally coupled to the first arm 404 of the first handrail member 138 at the respective top ends 518, 522. In such a structural arrangement, the first bracket 502, the first and second linkage members 514, 516, and the first handrail member 138 together form a four-bar linkage. The first bracket 502, the first linkage member 514, the second linkage member 516, and the first handrail member 138 form four sides, and the pivot pins 526, 534 form vertices of the four-bar linkage.

Figure 7:
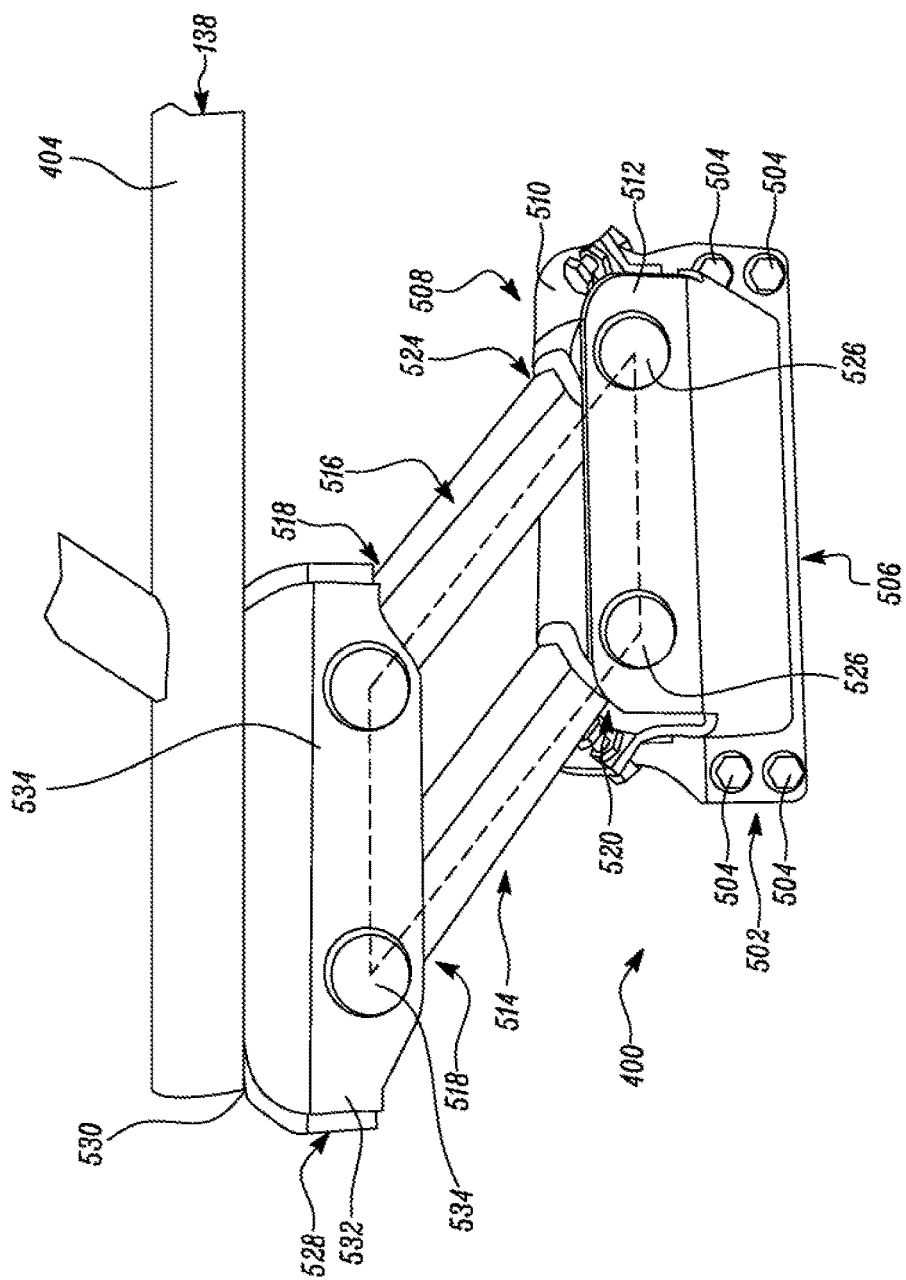
FIG. 7 shows another perspective view of the linkage mechanism illustrating four-bar linkage formed by the linkage mechanism, according to an aspect of the present disclosure.

With combined reference to FIGS. 5 and 6, configuration of the first linkage mechanism 400 corresponds to the extended position of the handrail assembly 136. The first and second linkage members 514, 516 lean towards the handrail assembly 136 in this configuration. FIG. 7 illustrates the configuration of the first linkage mechanism 400 corresponding to the retracted position of the handrail assembly 136. The first and second linkage members 514, 516 lean towards the frame 104 of the machine 100, and away from the handrail assembly 136. It should be contemplated that even though the handrail assembly 136 is shown with the second bracket 528, another embodiment without the second bracket 528 may easily be envisioned. Further, it should be understood that the second linkage mechanism 402 is exactly similar to the first linkage mechanism 400 in structural and functional aspects. The second linkage mechanism 402 includes similar components as the first linkage mechanism 400 and is not being discussed in detail in order to avoid repetition of subject matter.

Figure 8:
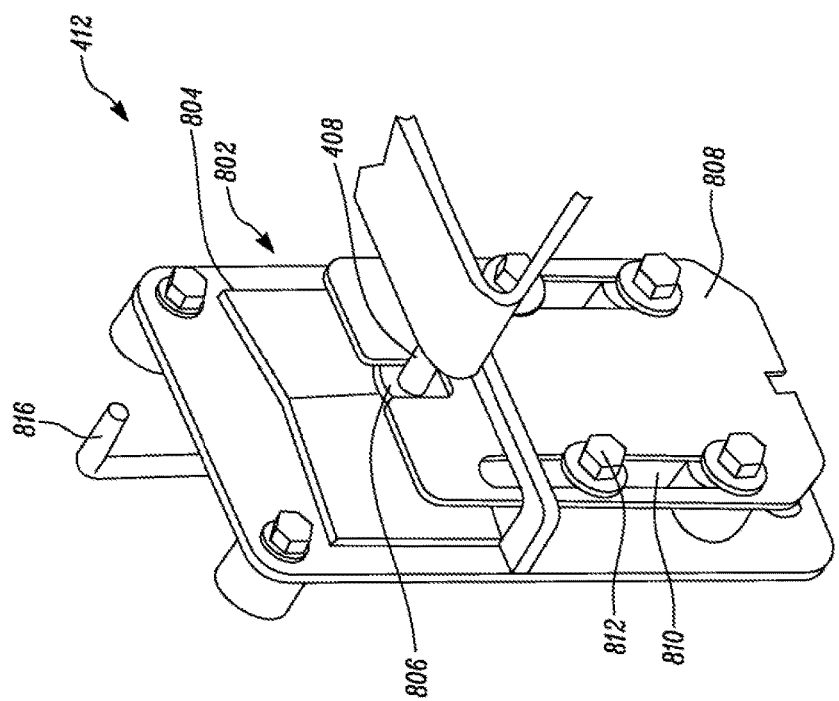
FIG. 8 shows a front perspective view of a latching mechanism for the handrail assembly, according to an aspect of the present disclosure.
Figure 9:
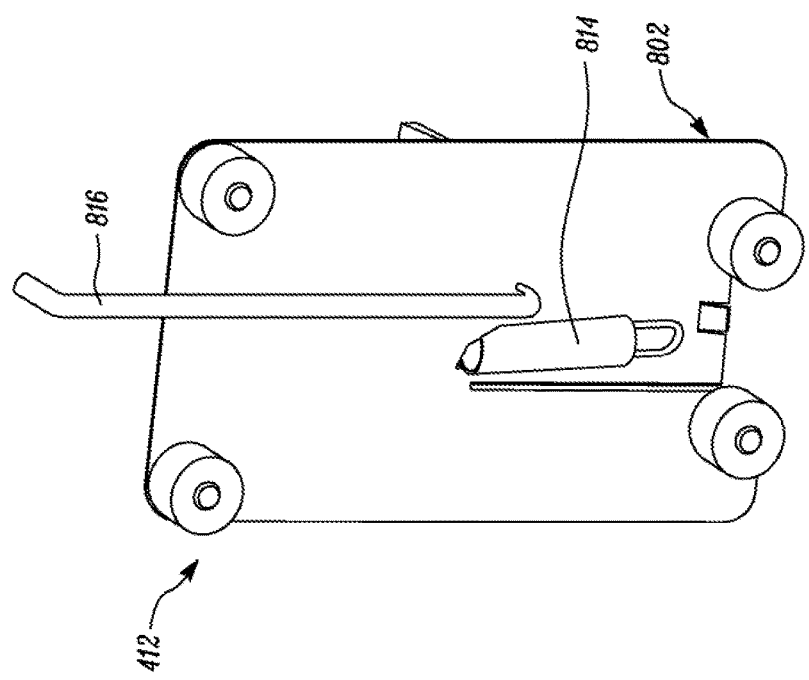
FIG. 9 shows a rear perspective view of the latching mechanism for the handrail assembly, according to an aspect of the present disclosure.

FIGS. 8 and 9 illustrate further structural details of the latching mechanism 412. The latching mechanism 412 retains the handrail assembly 136 in either one of the retracted position or the extended position. With combined reference to FIGS. 8 and 9, the latching mechanism 412 includes a base plate 802. The base plate 802 has a surface 804 which defines a slot 806. The slot 806 may receive any one of the first engagement pin 408 and the second engagement pin 410. The slot 806 receives the first engagement pin 408 in the extended position of the handrail assembly 136, and the slot 806 receives the second engagement pin 410 in the retracted position of the handrail assembly 136.

The latching mechanism 412 further includes a latch plate 808 coupled to the base plate 802. The latch plate 808 may move between a latch position and a release position. The latch plate 808 may be coupled to the base plate 802 through any suitable joining means which may allow the latch plate 808 to move relative to the base plate 802. In the illustrated embodiment, the latch plate 808 includes two elongated openings 810. Fasteners 812 couple the latch plate 808 to the base plate 802 through the elongated openings 810 such that the latch plate 808 may move relative to the base plate 802 in a vertical direction between the latch position and the release position.

The latch plate 808 is illustrated in the latch position in FIGS. 8 and 9. The latch plate 808 is biased to remain in the latch position by a biasing member 814. The biasing member 814 is coupled to the base plate 802 and the latch plate 808. The biasing member 814 may be a spring, an elastomer, a flexible material, or any other component which may be suitable for application with various aspects of the present disclosure. In the illustrated embodiment, the biasing member 814 is a spring. The latching mechanism 412 further includes a release lever 816. The release lever 816 actuates the latch plate 808 towards the release position from the latch position. The release lever 816 pushes the latch plate 808 towards the release position from the latch position against force applied by the biasing member 814 to keep the latch plate 808 in the latch position.

INDUSTRIAL APPLICABILITY

The present disclosure provides an improved arrangement for extending and retracting the handrail assembly 136 of the machine 100. The handrail assembly 136 is coupled to the frame 104 of the machine 100 through the first linkage mechanism 400 and the second linkage mechanism 402. The handrail assembly 136 needs to be switched between the extended position and the retracted position based on application requirements.

In the extended position, the slot 806 receives the first engagement pin 408. For switching the handrail assembly 136 from the extended position to the retracted position, an operator may press the release lever 816 to actuate the latch plate 808 towards the release position. The release lever 816 may be pressed once, and then released. As the latch plate 808 moves towards the release position, the first engagement pin 408 disengages with the slot 806. The operator may then hold the handrail assembly 136 and pull the handrail assembly 136 from the extended position to the retracted position. The operator may then engage the second engagement pin 410 with the slot 806 to retain the handrail assembly 136 in the retracted position.

Further, for switching the handrail assembly 136 from the retracted position to the extended position, the operator may press the release lever 816 to actuate the latch plate 808 towards the release position. The release lever 816 may be pressed once, and then released. As the latch plate 808 moves towards the release position, the second engagement pin 410 disengages with the slot 806. The operator may then hold the handrail assembly 136 and push the handrail assembly 136 from the retracted position to the extended position. The operator may then engage the first engagement pin 408 with the slot 806 to retain the handrail assembly 136 in the retracted position.

The first linkage mechanism 400 provided with the handrail assembly 136 facilitates easy switching of the handrail assembly 136 between the extended position and the retracted position. The first linkage mechanism 400 has a simple structure which may allow for easy servicing and maintenance procedures. The first linkage mechanism 400 has a cost-effective design which may be easily manufactured and installed with the machine 100. Also, the first linkage mechanism 400 may be used with any other similar machines as well without a lot of structural modifications. The latching mechanism 412 conveniently retains the handrail assembly 136 in the extended and retracted positions.

In the extended position, the handrail assembly 136 may provide additional space as well as better visibility in front of the machine 100 as the operator may safely access the extension platform 128 to look in front of the machine 100. Further, in the retracted position, the handrail assembly 136 is flush with the frame 104 of the machine 100 and does not extend laterally ahead of the frame 104. This provides the machine 100 with additional clearance space and the machine 100 may avoid contact with any obstacles, or roadside objects such as barriers, poles etc. which may otherwise collide with the machine 100 in the extended position of the handrail assembly 136. In another exemplary application with a mining machine which typically works in a constrained space environment, the handrail assembly 136 may provide with a more compact arrangement and prevent collision with inner walls of a mine or a tunnel etc. Structure of the handrail assembly 136 may allow the operator to crawl through the handrail assembly 136 in the retracted position as well in case of an evacuation etc., as the handrail assembly 136 has a very simple structure and allows appreciable spaces in between.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A machine comprising:
   a frame;
   an operator platform supported over the frame, wherein the operator platform has a front end and a rear end; and
   a handrail assembly coupled to the operator platform, the handrail assembly including:
      a first handrail member coupled to the frame towards the front end; and
      a linkage mechanism for connecting the first handrail member to the frame, such that the linkage mechanism allows the first handrail member to be pivotally moved between an extended position uncollapsed and a retracted position uncollapsed, the linkage mechanism including:
         a first bracket coupled to the frame; and
         a pair of linkage members pivotally connecting the first bracket and the first handrail member;
         wherein the first bracket, the pair of linkage members, and the first handrail member together form a four-bar linkage.

2. The machine of claim 1, wherein the handrail assembly further comprises a second handrail member coupled to the frame towards the rear end of the frame.

3. The machine of claim 2, wherein the second handrail member is coupled to the frame through another linkage mechanism.

4. The machine of claim 1, wherein the pair of linkage members comprises a first linkage member and a second linkage member.

5. The machine of claim 4, wherein:
   the first linkage member has a top end and a bottom end such that the first linkage member is pivotally coupled to the first handrail member at the top end, and the first linkage member is pivotally coupled to the first bracket at the bottom end; and
   the second linkage member has a top end and a bottom end such that the second linkage member is pivotally coupled to the first handrail member at the top end, and the second linkage member is pivotally coupled to the first bracket at the bottom end.

6. The machine of claim 1, wherein the handrail assembly further includes a first engagement pin, and a second engagement pin coupled to the first handrail member in a laterally spaced apart manner.

7. The machine of claim 6, further comprising a latching mechanism for coupling the handrail assembly to the frame of the machine, wherein the latching mechanism includes:
   a base plate defining a slot to receive at least one of the first engagement pin and the second engagement pin, wherein the slot receives the first engagement pin in the extended position of the handrail assembly, and the slot receives the second engagement pin in the retracted position of the handrail assembly;
   a latch plate coupled to the base plate, such that the latch plate is adapted to move between a release position and a latch position;
   a biasing member coupled to the base plate and the latch plate, such that the biasing member is adapted to bias the latch plate in the latch position;

a release lever adapted to actuate the latch plate towards the release position from the latch position;
wherein for moving the handrail assembly from the extended configuration to the retracted position;
the release lever is pressed to actuate the latch plate towards the release position;
the first engagement pin disengages with the slot; and
the second engagement pin engages with the slot.

8. The machine of claim 7, wherein for moving the handrail assembly from the retracted configuration to the extended position:
the release lever is pressed to actuate the latch plate towards the release position;
the second engagement pin disengages with the slot; and
the first engagement pin engages with the slot.

9. A handrail assembly for a machine, the handrail assembly comprising:
a first handrail member coupled to a frame of the machine; and
a linkage mechanism for connecting the first handrail member to the frame, such that the linkage mechanism allows the first handrail member to be pivotally moved between an extended position uncollapsed and a retracted position uncollapsed, the linkage mechanism including:
a first bracket coupled to the frame; and
a pair of linkage members pivotally connecting the first bracket and the first handrail member;
wherein the first bracket, the pair of linkage members, and the first handrail member together form a four-bar linkage.

10. The handrail assembly of claim 9, wherein the handrail assembly further comprises a second handrail member coupled to the frame towards the rear end of the frame.

11. The handrail assembly of claim 10, wherein the second handrail member is coupled to the frame through another linkage mechanism.

12. The handrail assembly of claim 9, wherein the pair of linkage members comprises a first linkage member and a second linkage member.

13. The handrail assembly of claim 12, wherein:
the first linkage member has a top end and a bottom end such that the first linkage member is pivotally coupled to the first handrail member at the top end, and the first linkage member is pivotally coupled to the first bracket at the bottom end; and
the second linkage member has a top end and a bottom end such that the second linkage member is pivotally coupled to the first handrail member at the top end, and the second linkage member is pivotally coupled to the first bracket at the bottom end.

14. The handrail assembly of claim 9, wherein the handrail assembly further includes a first engagement pin, and a second engagement pin coupled to the first handrail member in a laterally spaced apart manner.

15. The handrail assembly of claim 14, further comprising a latching mechanism for coupling the handrail assembly to the frame of the machine, wherein the latching mechanism includes:
a base plate defining a slot to receive at least one of the first engagement pin and the second engagement pin, wherein the slot receives the first engagement pin in the extended position of the handrail assembly, and the slot receives the second engagement pin in the retracted position of the handrail assembly;
a latch plate coupled to the base plate, such that the latch plate is adapted to move between a release position and a latch position;
a biasing member coupled to the base plate and the latch plate, such that the biasing member is adapted to bias the latch plate in the latch position;
a release lever adapted to actuate the latch plate towards the release position from the latch position;
wherein for moving the handrail assembly from the extended configuration to the retracted position;
the release lever is pressed to actuate the latch plate towards the release position;
the first engagement pin disengages with the slot; and
the second engagement pin engages with the slot.

16. The handrail assembly of claim 15, wherein for moving the handrail assembly from the retracted configuration to the extended position:
the release lever is pressed to actuate the latch plate towards the release position;
the second engagement pin disengages with the slot; and
the first engagement pin engages with the slot.

17. A machine comprising:
a plurality of ground engaging members adapted to propel the machine;
a frame supported over the plurality of ground engaging members;
a cutting mechanism coupled to the frame and including a housing defining a cutting chamber, and a rotatable cutter positioned within the housing and configured to cut material of a substrate underlying the machine;
an operator platform supported over the frame, wherein the operator platform has a front end and a rear end;
an extension platform pivotally coupled to the operator platform;
a handrail assembly coupled to the operator platform, and extending over the extension platform, the handrail assembly including:
a first handrail member coupled to the frame towards the front end;
a linkage mechanism for connecting the first handrail member to the frame, such that the linkage mechanism allows the first handrail member to be pivotally moved between an extended position uncollapsed and a retracted position uncollapsed, the linkage mechanism including:
a first bracket coupled to the frame; and
a pair of linkage members pivotally connecting the first bracket and the first handrail member;
wherein the first bracket, the pair of linkage members, and the first handrail member together form a four-bar linkage.

18. The machine of claim 17, wherein the handrail assembly further comprises a second handrail member coupled to the frame towards the rear end of the frame through another linkage mechanism.

19. The machine of claim 17, wherein the handrail assembly further includes a first engagement pin, and a second engagement pin coupled to the first handrail member in a laterally spaced apart manner.

20. The machine of claim 19, further comprising a latching mechanism for coupling the handrail assembly to the frame of the machine, wherein the latching mechanism includes:
a base plate defining a slot to receive at least one of the first engagement pin and the second engagement pin, wherein the slot receives the first engagement pin in the extended position of the handrail assembly, and the slot receives the second engagement pin in the retracted position of the handrail assembly;

a latch plate coupled to the base plate, such that the latch plate is adapted to move between a release position and a latch position;

a biasing member coupled to the base plate and the latch plate, such that the biasing member is adapted to bias the latch plate in the latch position;

a release lever adapted to actuate the latch plate towards the release position from the latch position;

wherein for moving the handrail assembly from the extended configuration to the retracted position;
   the release lever is pressed to actuate the latch plate towards the release position;
   the first engagement pin disengages with the slot; and
   the second engagement pin engages with the slot; and wherein for moving the handrail assembly from the retracted configuration to the extended position;

the release lever is pressed to actuate the latch plate towards the release position;

the second engagement pin disengages with the slot; and the first engagement pin engages with the slot.

\* \* \* \* \*